United States Patent
Choi et al.

(10) Patent No.: US 12,288,001 B2
(45) Date of Patent: Apr. 29, 2025

(54) ELECTRONIC DEVICE FOR CONTROLLING AT LEAST ONE INPUT DEVICE AND CONTROL METHOD THEREOF

(71) Applicant: Samsung Electronics Co., Ltd., Suwon-si (KR)

(72) Inventors: Bokun Choi, Suwon-si (KR); Minho Kang, Suwon-si (KR); Gajin Song, Suwon-si (KR); Jaeyung Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/615,381

(22) Filed: Mar. 25, 2024

(65) Prior Publication Data
US 2024/0231733 A1   Jul. 11, 2024

Related U.S. Application Data

(63) Continuation of application No. PCT/KR2022/014290, filed on Sep. 23, 2022.

(30) Foreign Application Priority Data

Sep. 28, 2021   (KR) .................. 10-2021-0128325

(51) Int. Cl.
*G06F 3/14*       (2006.01)
*G06F 3/0488*    (2022.01)
(Continued)

(52) U.S. Cl.
CPC .......... *G06F 3/1423* (2013.01); *G06F 3/0488* (2013.01); *G06F 3/023* (2013.01); *G06F 3/03543* (2013.01)

(58) Field of Classification Search
CPC .... G06F 3/1423; G06F 3/1454; G06F 3/1462; G06F 3/1431; G09G 2370/042; G09G 2370/16
See application file for complete search history.

(56) References Cited

U.S. PATENT DOCUMENTS

2010/0138780 A1*  6/2010  Marano .................. G06F 9/452
                                                              715/781
2012/0096076 A1    4/2012  Chan
(Continued)

FOREIGN PATENT DOCUMENTS

JP    2006154206 A     6/2006
JP    2011221779 A    11/2011
(Continued)

OTHER PUBLICATIONS

International Search Report for PCT/KR2022/014290 mailed Jan. 12, 2023, 3 pages.
(Continued)

*Primary Examiner* — Koosha Sharifi-Tafreshi
(74) *Attorney, Agent, or Firm* — Nixon & Vanderhye, P.C.

(57) ABSTRACT

Disclosed are an electronic device for controlling at least one input device and a control method thereof. An electronic device, according to an embodiment of the disclosure, may: acquire identification information of an external display device based on the electronic device being operably connected to the external display device; acquire identification information of at least one input device from the at least one input device located within a threshold proximity of the electronic device; compare the acquired identification information of the at least one input device with reference information of the input device associated with the identification information of the external display device and stored
(Continued)

in the memory; and connect to the at least one input device based on a result of the comparison.

20 Claims, 15 Drawing Sheets

(51) Int. Cl.
  *G06F 3/023*     (2006.01)
  *G06F 3/0354*   (2013.01)

(56) References Cited

U.S. PATENT DOCUMENTS

| | | |
|---|---|---|
| 2014/0013014 A1 | 1/2014 | Huang |
| 2014/0075330 A1 | 3/2014 | Kwon |
| 2014/0139749 A1 | 5/2014 | Kim |
| 2014/0237015 A1 | 8/2014 | Bruins |
| 2014/0237222 A1 | 8/2014 | Bull |
| 2016/0085439 A1 | 3/2016 | Threlkeld |
| 2017/0231016 A1 | 8/2017 | Park |
| 2019/0065018 A1* | 2/2019 | Keam ................... G06F 3/041 |
| 2019/0294400 A1 | 9/2019 | Lee |
| 2020/0367142 A1 | 11/2020 | Ko |
| 2021/0067727 A1 | 3/2021 | Yu |

FOREIGN PATENT DOCUMENTS

| | | | | |
|---|---|---|---|---|
| JP | 2013125291 A | | 6/2013 | |
| JP | 2014053014 A | * | 3/2014 | ............ G06F 13/14 |
| KR | 20110111828 A | | 10/2011 | |
| KR | 20140034100 A | | 3/2014 | |
| KR | 20140034612 A | | 3/2014 | |
| KR | 20140064141 A | | 5/2014 | |
| KR | 20170092966 A | | 8/2017 | |
| KR | 20190083470 A | | 7/2019 | |
| KR | 20190112406 A | | 10/2019 | |

OTHER PUBLICATIONS

Written Opinion of the ISA for PCT/KR2022/014290 mailed Jan. 12, 2023, 4 pages.

* cited by examiner

ELECTRONIC DEVICE FOR CONTROLLING AT LEAST ONE INPUT DEVICE AND CONTROL METHOD THEREOF

CROSS-REFERENCE TO RELATED APPLICATIONS

This application is a continuation of International Application No. PCT/KR2022/014290 designating the United States, filed on Sep. 23, 2022, in the Korean Intellectual Property Receiving Office and claiming priority to Korean Patent Application No. 10-2021-0128325, filed on Sep. 28, 2021, in the Korean Intellectual Property Office, the disclosures of each of which are incorporated by reference herein in their entireties.

BACKGROUND

Field

The disclosure relates to an electronic device for controlling at least one input device and a method of controlling the same.

Description of Related Art

Various services and additional functions provided through electronic devices, for example, portable electronic devices such as smartphones have gradually increased. In order to increase the effective value of such electronic devices and satisfy various user needs, communication service providers or electronic device manufacturers have provided various functions and competitively developed electronic devices that are differentiated from those of other companies. Accordingly, various functions provided through the electronic device have gradually advanced.

A desktop mode (referred to as a "dex mode" for convenience of description the disclosure) may be a function or an operation of, when a portable terminal (for example, a smartphone) is wirelessly or wiredly connected to an external display device or an external computing device (PC, note PC, or tablet), providing a user interface (for example, screen) optimized for the connected device. When the dex mode is used, a first screen (for example, a home screen) based on a first application may be displayed on the portable terminal, and a second screen different from the first screen may be displayed on the external display device. For example, the second screen may be based on a second application different from the first application. It is possible to increase the usability by displaying the application (for example, the second application) executed in the portable terminal through the external display device including a display larger than the portable terminal.

When a dex mode is used, a user of a portable terminal may control the portable terminal through at least one input device (for example, a mouse and/or a keyboard) connected to the portable terminal to be operable. In this case, a graphic object (for example, a cursor or a pointer) for controlling the portable terminal may be displayed in an external display device and controlled by at least one input device.

The input devices (for example, the mouse and/or the keyboard) connected to the portable terminal to be used in the dex mode may maintain the connectivity with the portable terminal even though the dex mode ends. When another portable terminal operates in the dex mode and uses the input devices (for example, the mouse and/or the keyboard) connected to the portable terminal to be used, a complex process may be needed in that the portable terminal should end the connection with the input devices and the other portable terminal should make the connection with the input devices.

SUMMARY

Embodiments of the disclosure may provide an electronic device capable of, when release of the connection between the electronic device and the external display device is detected, releasing the connection with at least one input device connected to the electronic device and allowing the connection with at least one input device of the other electronic device may be provided.

Embodiments of the disclosure may provide an electronic device capable of rapidly configuring the connection with at least one input device by selectively configuring the connection with at least one input device associated with the external display device (for example, also connected to the external display device) may be provided.

An electronic device according to an example embodiment of the disclosure includes: memory, a touch screen display, and at least one processor, comprising processing circuitry, wherein at least one processor, individually and/or collectively, is configured to: obtain identification information of an external display device, based on the electronic device being operatively connected with the external display device, a first screen being displayed in the touch screen display and a second screen different from the first screen being displayed in the external display device, obtain identification information of at least one input device from the at least one input device located within a threshold proximity of the electronic device, compare the acquired identification information of the at least one input device with reference information of input devices stored to be correlated with the identification information of the external display device in the memory, connect to the at least one input device, based on a result of comparison, and based on the connection with the external display device being released, disable a connection allowance authority (e.g., preference) with the at least one input device.

A method of controlling an electronic device according to an example embodiment of the disclosure includes: obtaining identification information of an external display device, based on the electronic device being operatively connected with the display device, a first screen being displayed in a touch screen display of the electronic device and a second screen different from the first screen being displayed in the external display device, obtaining identification information of at least one input device from the at least one input device located within a threshold proximity of the electronic device, comparing the acquired identification information of the at least one input device with reference information of input devices stored to be correlated with the identification information of the external display device in the memory of the electronic device, connecting to the at least one input device, based on a result of comparison, and based on the connection with the external display device being released, disabling a connection allowance authority (e.g., preference) with the at least one input device.

According to various example embodiments of the disclosure, an electronic device capable of, when release of a connection between an electronic device and an external display device is detected, automatically (for example, without a user input) deactivating at least one input device connected to the electronic device (configuring a right to allow the connection (preference) as disable) and allowing a connection with at least one input device of another electronic device when the other electronic device is connected to the external display device can be provided.

According to various example embodiments of the disclosure, an electronic device capable of rapidly configuring the connection with at least one input device by selectively configuring the connection with at least one input device associated with the external display device (for example, also connected to the external display device) can be provided.

Effects according to various example embodiments are not limited to the above-described effects and it will be apparent to those skilled in the art that various effects are implied in the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
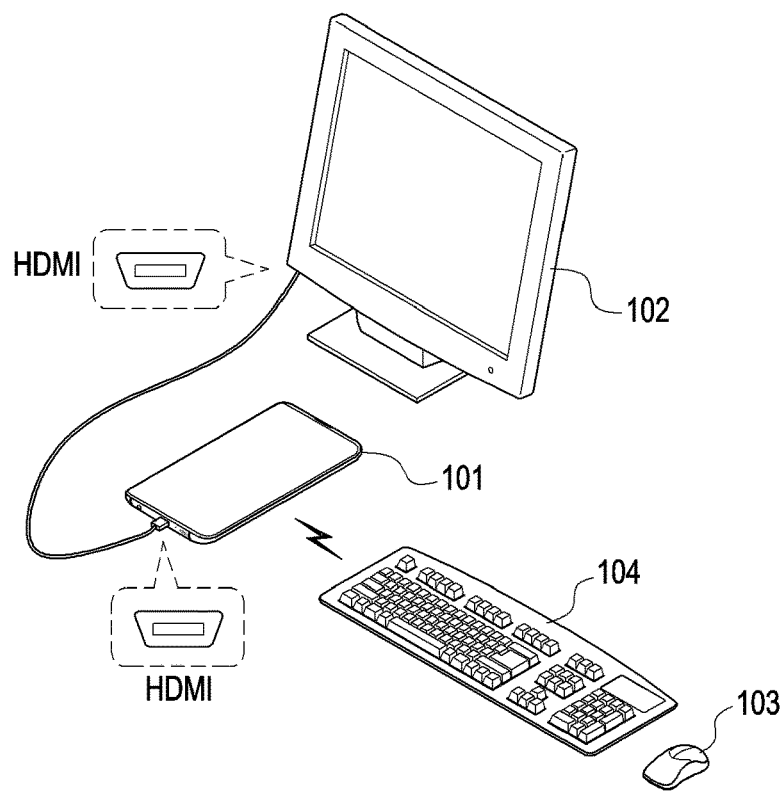
FIGS. 1A, 1B, and 1C are diagrams illustrating examples of a problem of the prior art in the dex mode.
Figure 1B:
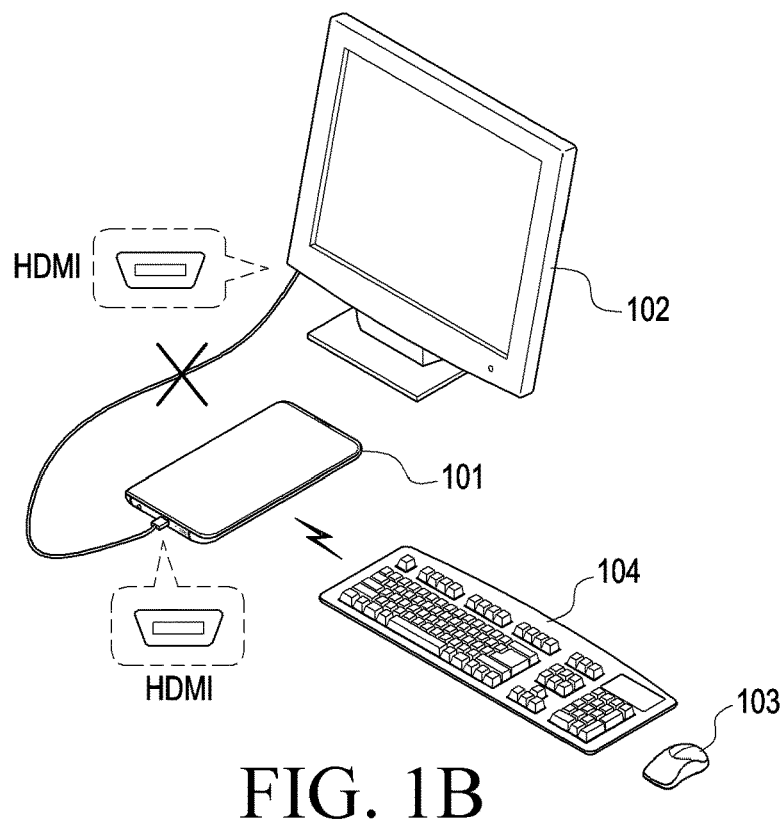
Figure 1C:
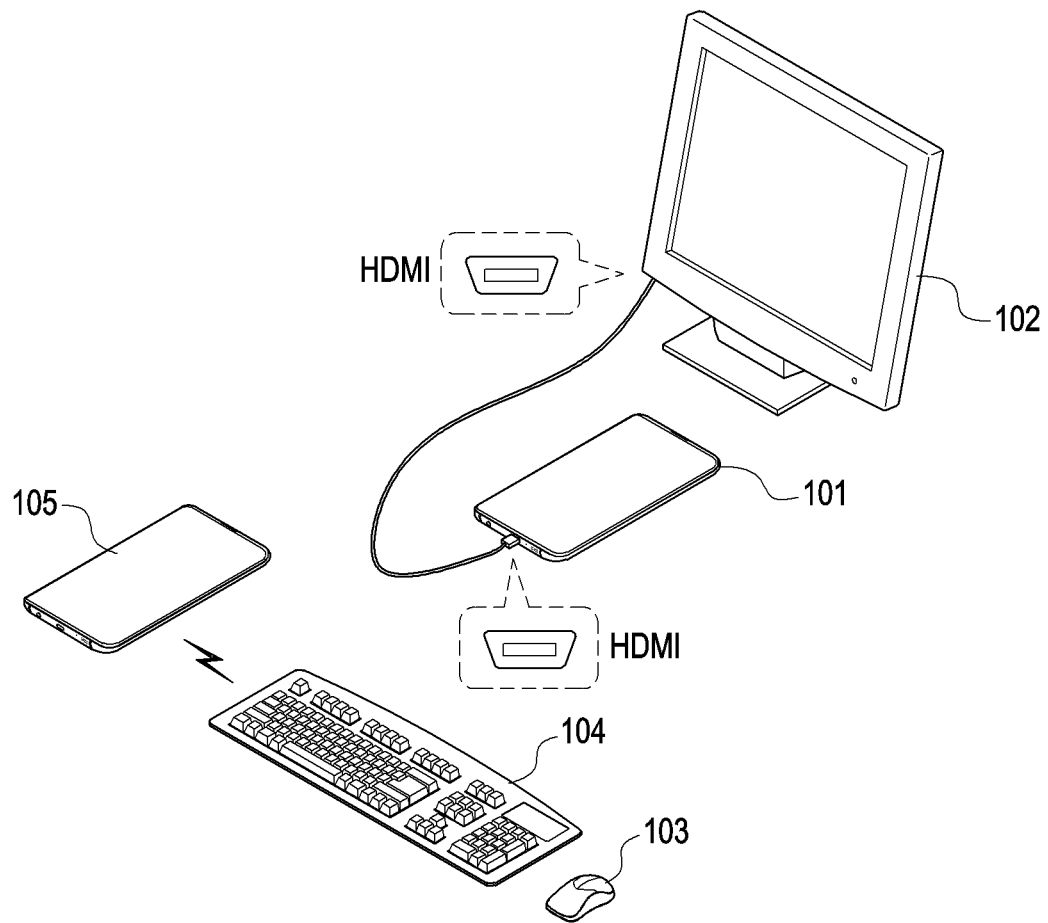

FIGS. 1A, 1B and 1C are diagrams illustrating examples of a problem of the prior art in the dex mode. Referring to FIG. 1A, a first portable terminal 101 according to the prior art may be connected to a first external device 102 through wired communication. In this case, a first screen (for example, a home screen) may be displayed on the first portable terminal 101 according to the prior art and a second screen different from the first screen may be displayed on the first external device 102. The first portable terminal 101 according to the prior art may be connected to a third external device 103 (for example, a mouse) and a fourth external device 104 (for example, a keyboard) through short-range wireless communication. In this case, a user of the first portable terminal 101 may control the first portable terminal 101 by controlling the screen displayed on the first external device 102 through the third external device 103 (for example, the mouse) and the fourth external device 104 (for example, the keyboard).

Referring to FIG. 1B, the connection between the first portable terminal 101 according to the prior art and the first external device 102 may be released (for example, the dex mode may be released). However, in this case, according to the prior art, the connection between the third external device 103 (for example, the mouse) and the fourth external device 104 (for example, the keyboard), and the portable terminal 101 may be maintained.

Referring to FIG. 1C, when the second portable terminal 105 according to the prior art is connected to the first external device 102 (for example, the dex mode is activated), a second portable terminal 105 may need additional operations for the connection with the third external device 103 (for example, the mouse) and the fourth external device 104 (for example, the keyboard) in order to use the third external device 103 (for example, the mouse) and the fourth external device 104 (for example, keyboard) after the connection with the third external device 103 (for example, the mouse) and the fourth external device 104 (for example, the keyboard) connected to the first portable terminal 101 is released. The need of the additional operations may deteriorate user convenience in that the portable terminal (for example, the first portable terminal 101 or the second portable terminal 105) is used through the external display device (for example, the first external device 102).

Figure 2:
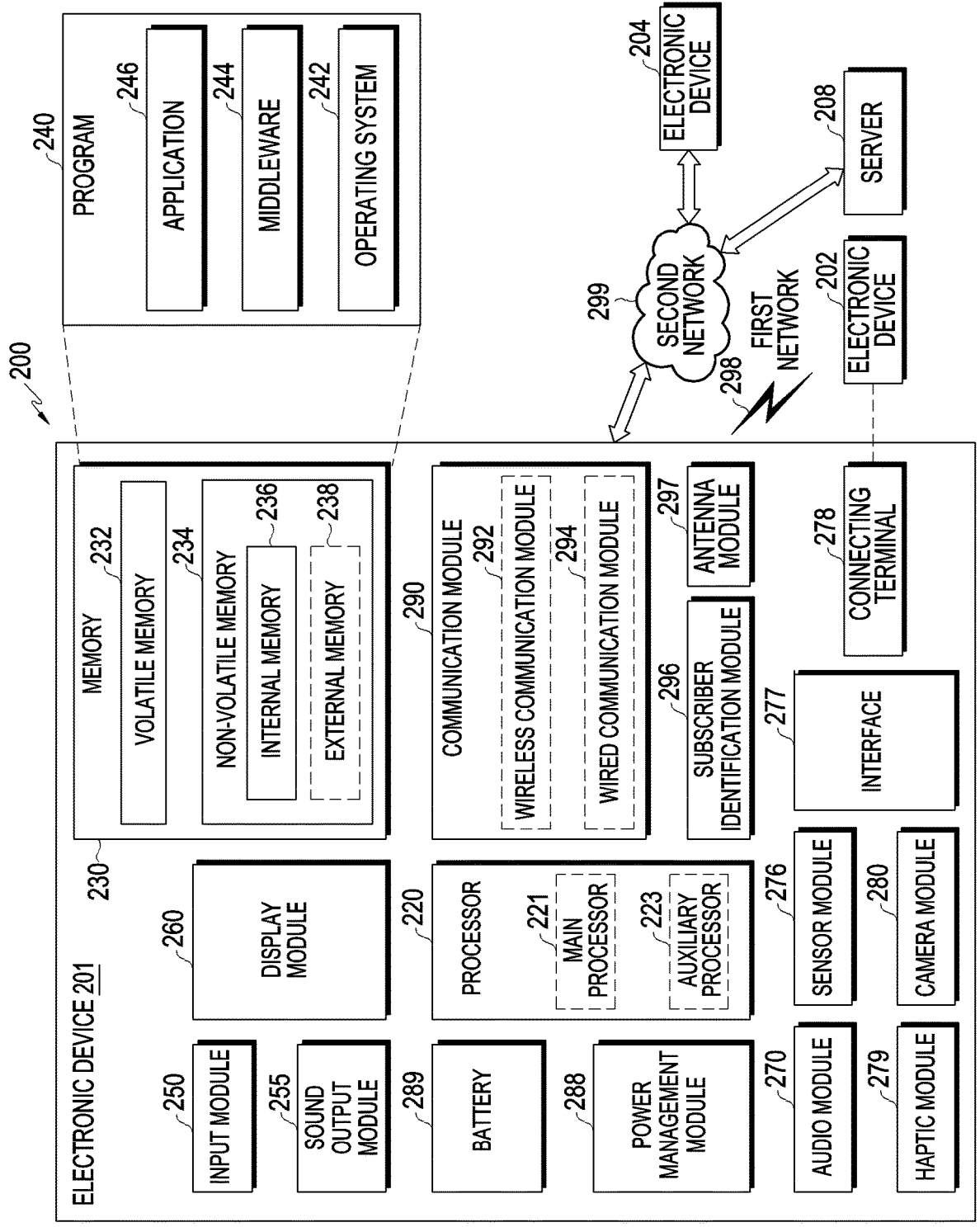
FIG. 2 is a block diagram illustrating an example electronic device within a network environment according to various embodiments.

FIG. 2 is a block diagram illustrating an example electronic device 201 in a network environment 200 according to various embodiments. Referring to FIG. 2, the electronic device 201 in the network environment 200 may communicate with an electronic device 202 via a first network 298 (e.g., a short-range wireless communication network), or at least one of an electronic device 204 or a server 208 via a second network 299 (e.g., a long-range wireless communication network). According to an embodiment, the electronic device 201 may communicate with the electronic device 204 via the server 208. According to an embodiment, the electronic device 201 may include a processor 220, memory 230, an input module 250, a sound output module 255, a display module 260, an audio module 270, a sensor module 276, an interface 277, a connecting terminal 278, a haptic module 279, a camera module 280, a power management module 288, a battery 289, a communication module 290, a subscriber identification module (SIM) 296, or an antenna module 297. In various embodiments, at least one of the components (e.g., the connecting terminal 278) may be omitted from the electronic device 201, or one or more other components may be added in the electronic device 201. In various embodiments, some of the components (e.g., the sensor module 276, the camera module 280, or the antenna module 297) may be implemented as a single component (e.g., the display module 260).

The processor 220 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 220 may execute, for example, software (e.g., a program 240) to control at least one other component (e.g., a hardware or software component) of the electronic device 201 coupled with the processor 220, and may perform various data processing or computation. According to an embodiment, as at least part of the data processing or computation, the processor 220 may store a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), or an auxiliary processor 223 (e.g., a graphics processing unit (GPU), a neural processing unit (NPU), an image signal processor (ISP), a sensor hub processor, or a communication processor (CP)) that is operable independently from, or in conjunction with, the main processor 221. For example, when the electronic device 201 includes the main processor 221 and the auxiliary processor 223, the auxiliary processor 223 may be adapted to consume less power than the main processor 221, or to be specific to a specified function. The auxiliary processor 223 may be implemented as separate from, or as part of the main processor 221.

The auxiliary processor 223 may control at least some of functions or states related to at least one component (e.g., the display module 260, the sensor module 276, or the communication module 290) among the components of the electronic device 201, instead of the main processor 221 while the main processor 221 is in an inactive (e.g., sleep) state, or together with the main processor 221 while the main processor 221 is in an active state (e.g., executing an application). According to an embodiment, the auxiliary processor 223 (e.g., an image signal processor or a communication processor) may be implemented as part of another component (e.g., the camera module 280 or the communication module 290) functionally related to the auxiliary processor 223. According to an embodiment, the auxiliary processor 223 (e.g., the neural processing unit) may include a hardware structure specified for artificial intelligence model processing. An artificial intelligence model may be generated by machine learning. Such learning may be performed, e.g., by the electronic device 201 where the artificial intelligence is performed or via a separate server (e.g., the server 208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input module 250 may receive a command or data to be used by another component (e.g., the processor 220) of the electronic device 201, from the outside (e.g., a user) of the electronic device 201. The input module 250 may include, for example, a microphone, a mouse, a keyboard, a key (e.g., a button), or a digital pen (e.g., a stylus pen).

The sound output module 255 may output sound signals to the outside of the electronic device 201. The sound output module 255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 260 may visually provide information to the outside (e.g., a user) of the electronic device 201. The display module 260 may include, for example, a display, a hologram device, or a projector and control circuitry to control a corresponding one of the display, hologram device, and projector. According to an embodiment, the display module 260 may include a touch sensor adapted to detect a touch, or a pressure sensor adapted to measure the intensity of force incurred by the touch.

The audio module 270 may convert a sound into an electrical signal and vice versa. According to an embodiment, the audio module 270 may obtain the sound via the input module 250, or output the sound via the sound output module 255 or a headphone of an external electronic device (e.g., an electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly (e.g., wiredly) or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the electronic device 202). According to an embodiment, the connecting terminal 278 may include, for example, a HDMI connector, a USB connector, a SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to an embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device 204 via the first network 298 (e.g., a short-range communication network, such as Bluetooth™ wireless-fidelity (Wi-Fi) direct, or infrared data association (IrDA)) or the second network 299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first network 298 or the second network 299, using subscriber information (e.g., international mobile subscriber identity (IMSI)) stored in the subscriber identification module 296.

The wireless communication module 292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., the mmWave band) to achieve, e.g., a high data transmission rate. The wireless communication module 292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 292 may support various requirements specified in the electronic device 201, an external electronic device (e.g., the electronic device 204), or a network system (e.g., the second network 299). According to an embodiment, the wireless communication module 292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 297 may transmit or receive a signal or power to or from the outside (e.g., the external electronic device) of the electronic device 201. According to an embodiment, the antenna module 297 may include an antenna including a radiating element including a conductive material or a conductive pattern formed in or on a substrate (e.g., a printed circuit board (PCB)). According to an embodiment, the antenna module 297 may include a plurality of antennas (e.g., array antennas). In such a case, at least one antenna appropriate for a communication scheme used in the communication network, such as the first network 298 or the second network 299, may be selected, for example, by the communication module 290 (e.g., the wireless communication module 292) from the plurality of antennas. The signal or the power may then be transmitted or received between the communication module 290 and the external electronic device via the selected at least one antenna. According to an embodiment, another component (e.g., a radio frequency integrated circuit (RFIC)) other than the radiating element may be additionally formed as part of the antenna module 297.

According to various embodiments, the antenna module 297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. Each of the electronic devices 202 or 204 may be a device of a same type as, or a different type, from the electronic device 201. According to an embodiment, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, mobile edge computing (MEC), or client-server computing technology may be used, for example. The electronic device 201 may provide ultra low-latency services using, e.g., distributed computing or mobile edge computing. In an embodiment, the external electronic device 204 may include an internet-of-things (IoT) device. The server 208 may be an intelligent server using machine learning and/or a neural network. According to an embodiment, the external electronic device 204 or the server 208 may be included in the second network 299. The electronic device 201 may be applied to intelligent services (e.g., smart home, smart city, smart car, or healthcare) based on 5G communication technology or IoT-related technology.

Figure 3:
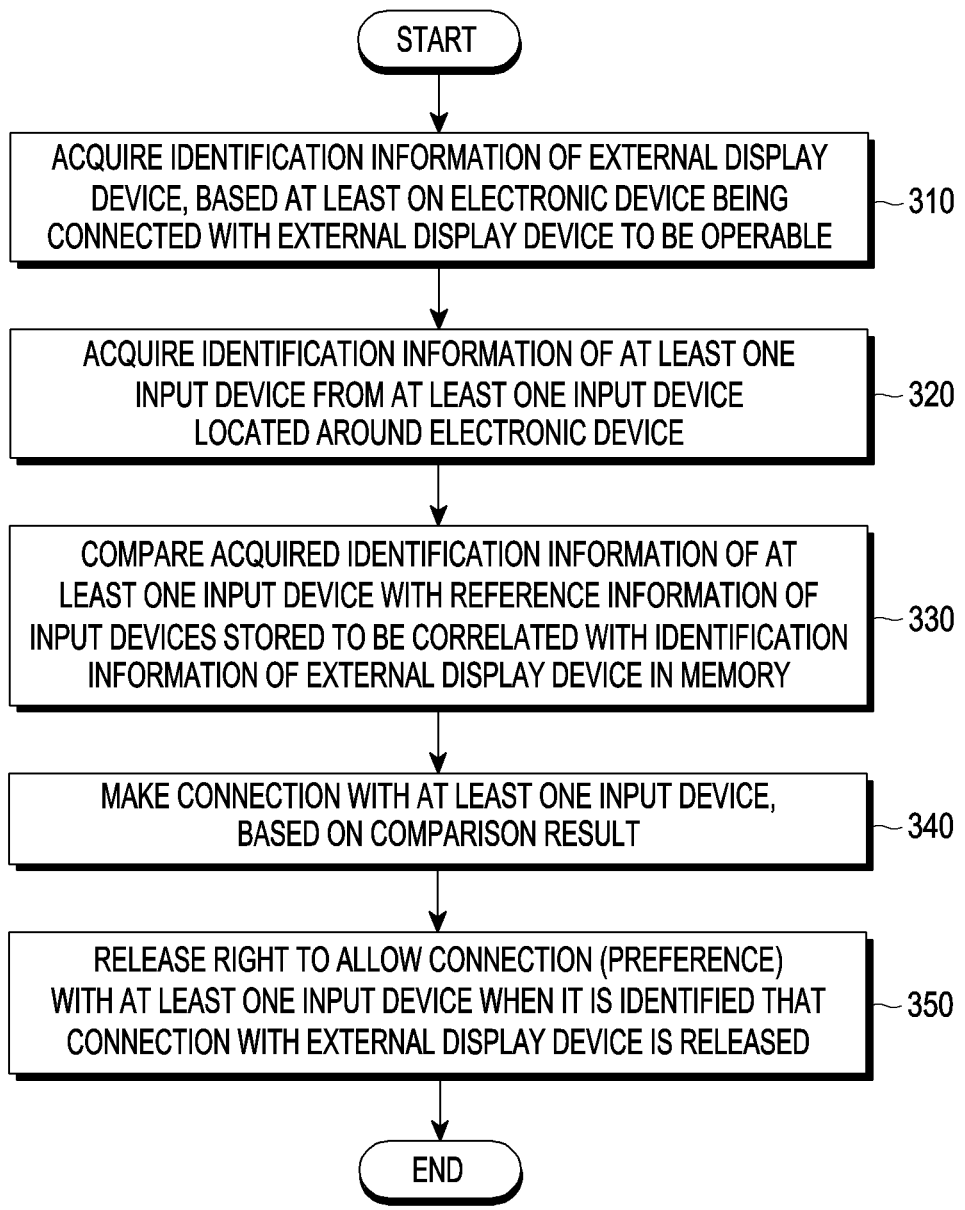
FIG. 3 is a flowchart illustrating an example function or an example operation of, when an electronic device makes a connection with an external display device and the connection is released, releasing a right to make a connection to at least one input device, based on the right to make the connection according to various embodiments.
Figure 4A:
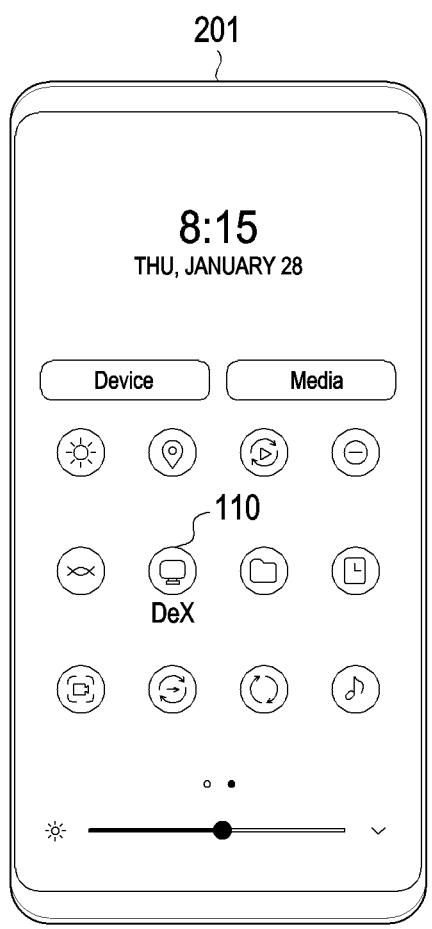
FIGS. 4A, 4B, 4C and 4D are diagrams illustrating various examples in which an electronic device is connected to an external display device to be operable according to various embodiments.
Figure 4B:
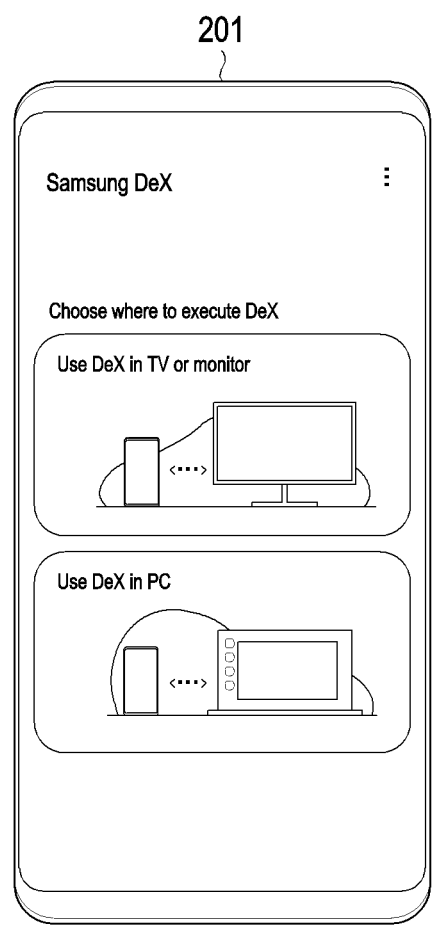
Figure 4C:
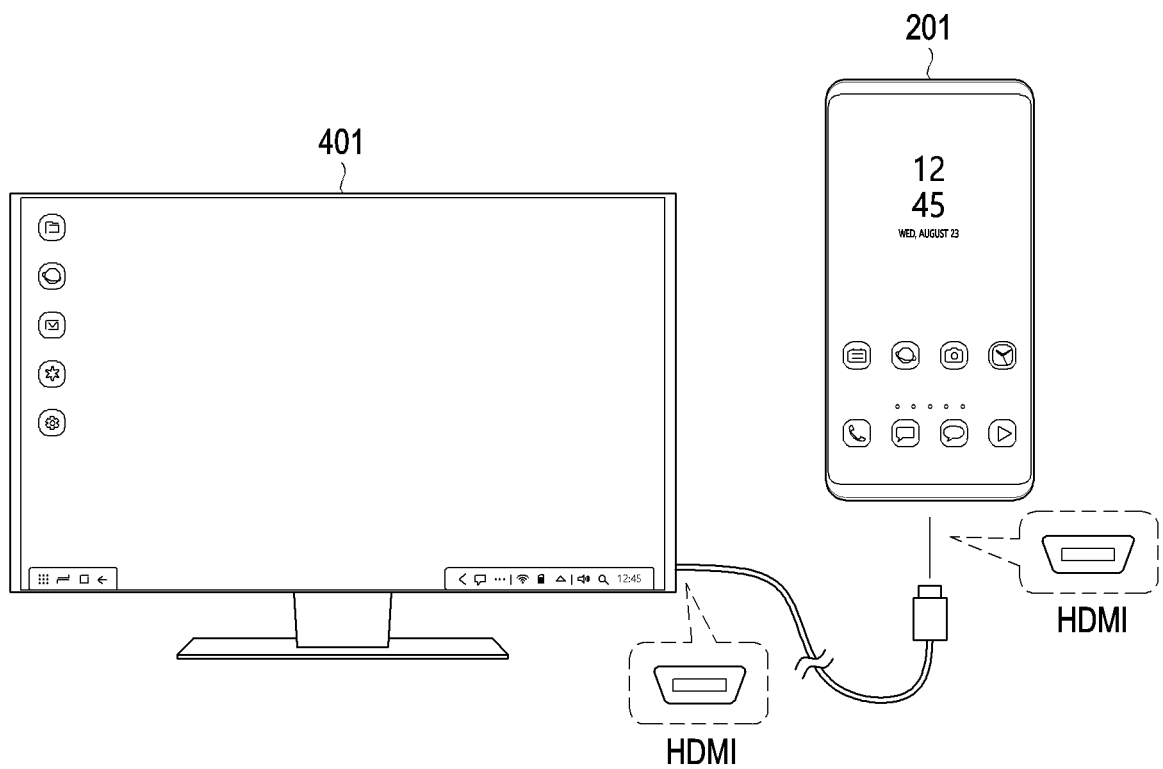
Figure 4D:
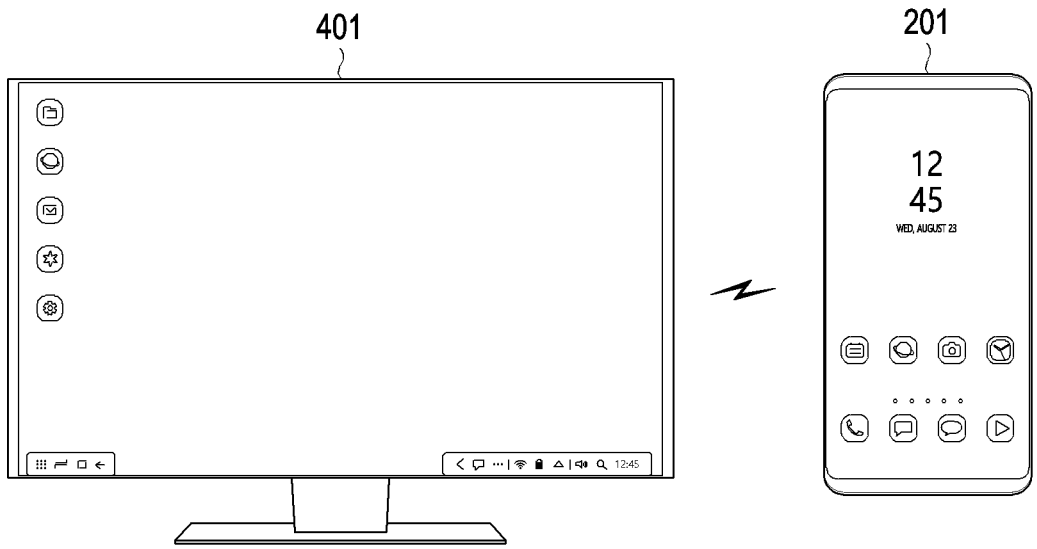
Figure 5:
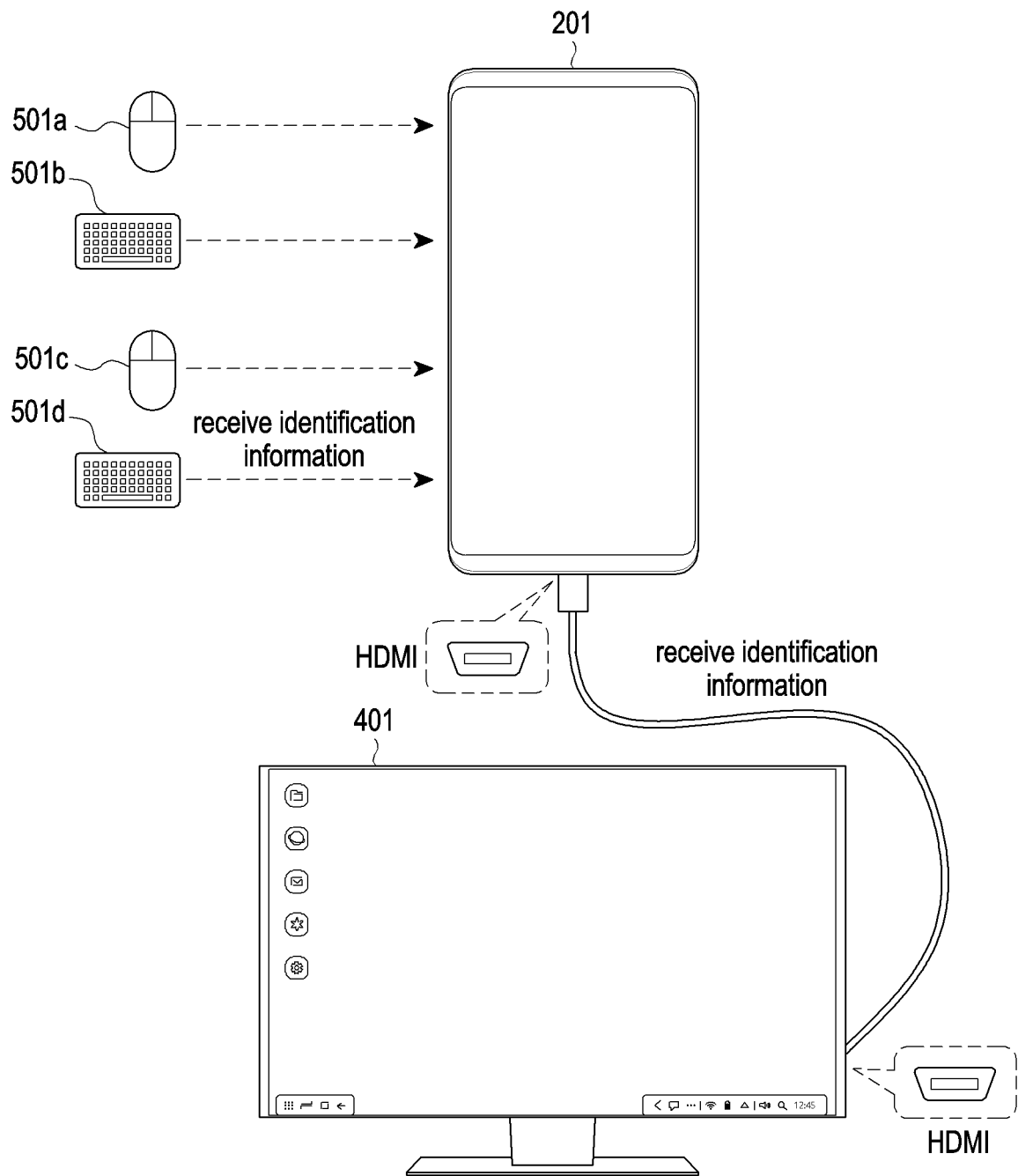
FIG. 5 is a diagram illustrating an example function or an example operation in which an electronic device receives identification information from an external display device and at least one input device according to various embodiments.

FIG. 3 is a flowchart illustrating an example function or an example operation of, when an electronic device makes a connection with an external display device and the connection is released, releasing a connection allowance authority to at least one input device, based on the right to allow the connection according to various embodiments. FIGS. 4A, 4B, 4C and 4D are diagrams illustrating various examples in which an electronic device 201 is connected to an external display device 401 to be operable according to various embodiments. FIG. 5 is a diagram illustrating an example function or an example operation in which an electronic device receives identification information from an external display device and at least one input device according to various embodiments.

Referring to FIG. 3, the electronic device 201 according to an embodiment of the disclosure may acquire identification information of an external display device 401, based at least on the electronic device 201 is connected to the external display device 401 to be operable in operation 310. Referring to FIG. 4A, after the electronic device 201 is connected to the external display device 401 (for example, connected through wired communication or wireless communication) to be operable, a user input for the user interface 110 of executing the dex mode may be received. Referring to FIG. 4B, when the user input for the user interface 110 of executing the dex mode is received, the electronic device 201 according to an embodiment of the disclosure may display a user interface for selecting the external display device 401 to display a screen. For example, when the number of external display devices (for example, external display devices 401) to which the electronic device 201 is connected to execute the dex mode is plural, a user interface for selecting one of them may be displayed. As described above, according to an embodiment of the disclosure, as the user input for the user interface 110 for executing the dex mode is received, the electronic device 201 according to an embodiment of the disclosure may determine a user's intent to display, on the external display device 401, a screen different from that on the electronic device 201. In this case, when the user input for the user interface 110 for executing the dex mode is received, the electronic device 201 according to an embodiment of the disclosure may acquire identification information of the external display device 401. Referring to FIG. 4C, the electronic device 201 according to an embodiment of the disclosure and the external display device 401 may be connected through wired communication. For example, the electronic device 201 and the external display device 401 may perform wired communication through an HDMI or a USB. Referring to FIG. 4D, the electronic device 201 according to an embodiment of the disclosure and the external display device 401 may be connected through wireless communication. For example, the electronic device 201 and the external display device 401 may perform wireless communication through Wi-Fi or Wi-Fi direct. When the electronic device 201 and the external display device 401 are connected through wired communication or wireless communication, the electronic device 201 according to an embodiment of the disclosure may execute the dex mode without receiving the user input for the user interface 110 for executing the dex mode. When the dex mode is executed, the electronic device 201 according to an embodiment may acquire identification information of the external display device 401 from the external display device 401. According to an embodiment of the disclosure, a user interface such as a popup window of asking the user about whether to receive identification information of the external display device 401 may be provided, and identification information of the external display device 401 may be acquired according to selection input by the user. According to an embodiment of the disclosure, the electronic device 201 according to an embodiment of the disclosure may make the connection with the external display device 401 by coming into contact with a specific part of the external display device 401 to be connected, through the electronic device. Referring to FIG. 5, the electronic device 201 according to an embodiment of the disclosure may acquire identification information of the external display device 401 from the external display device 401. The identification information of the external display device 401 according to an embodiment of the disclosure may include, for example, information on a manufacturer name of the external display device 401, a product name, a product serial number, a product type, an extended display identification data (EDID) version, a fluorescent substance or filter type, timing, a screen size, luminance, and/or pixels as illustrated, for example, in [Table 1] below.

TABLE 1

| Address (decimal number) | Data | Explanation |
| --- | --- | --- |
| 0-7 | Header | Consistently fixed pattern |
| 8-9 | Manufacturer ID | Display product identification |
| 10-11 | Product ID code | |
| 12-15 | Serial number | |
| 16-17 | Manufacturing date | |
| 18 | EDID version | EDID version information |
| 19 | EDID revision | |
| 20 | Video input type | Basic display parameter |
| 21 | Horizontal size (CM) | |

TABLE 1-continued

| Address (decimal number) | Data | Explanation |
|---|---|---|
| 22 | Vertical size (CM) | |
| 23 | Display gamma | |
| 24 | Supported function | |
| 25-34 | Color characteristics | Color space definition |
| 25-36 | Supported setting timing | Timing information of all resolutions supported by display |
| 37 | Reserved timing of manufacturer | |
| 38-53 | Supported EDID standard timing | |
| 54-71 | Detailed timing descriptor block 1 | |
| 72-89 | Detailed timing descriptor block 2 | |
| 90-107 | Detailed timing descriptor block 3 | |
| 108-125 | Detailed timing descriptor block 4 | |
| 126 | Extension flag | Number of 128-byte extension blocks to follow |
| 127 | checksum | |

The electronic device 201 according to an embodiment of the disclosure may acquire identification information of at least one input device from at least one input device (for example, a first input device 501a, a second input device 501b, a third input device 501c, and/or a fourth input device 501d) within a threshold proximity of the electronic device 201 in operation 320. The identification information of at least one input device (for example, the first input device 501a, the second input device 501b, the third input device 501c, and/or the fourth input device 501d) according to an embodiment of the disclosure may include, for example, a name, a Bluetooth MAC address, and/or a manufacturer name of at least one input device (for example, the first input device 501a, the second input device 501b, the third input device 501c, and/or the fourth input device 501d). The electronic device 201 according to an embodiment of the disclosure may compare the acquired identification information of at least one input device (for example, the first input device 501a, the second input device 501b, the third input device 501c, and/or the fourth input device 501d) with reference information of an input device stored to be correlated with the identification information of the external display device 401 in memory in operation 330. The memory (for example, the memory 230 of FIG. 2) according to an embodiment of the disclosure may store reference information illustrated, for example, in [Table 2] below.

TABLE 2

| external device identification code (From EDID) | Input Method #1(keyboard) | Input Method #2(Mouse) |
|---|---|---|
| A company 1268798694 | D company keyboard (BD_ADDR - BC:85:56:10:AB:BI) | D company Mouse (BD_ADDR - 00:10:65:C0:00:01) |
| B company 810303126 | E Company keyboard (BD_ADDR - 01:23:45:AB:BI:4A) | E company Mouse (BD_ADDR - C8:60:00:BA:95:65) |
| C company 889576312 | | |

The electronic device 201 according to an embodiment of the disclosure may determine whether there is identification information that matches the external display device 401 and whether there is an input device having identification information that matches reference information among the identification information of at least one input device (for example, the first input device 501a, the second input device 501b, the third input device 501c, and/or the fourth input device 501d).

The electronic device 201 according to an embodiment of the disclosure may make the connection with at least one input device (for example, the first input device 501a, the second input device 501b, the third input device 501c, and/or the fourth input device 501d), based on the comparison result in operation 340. When it is identified that the connection with the external display device is released, the electronic device 201 according to an embodiment of the disclosure may release a right to allow the connection with at least one input device (for example, the first input device 501a, the second input device 501b, the third input device 501c, and/or the fourth input device 501d) in operation 350.

Figure 6:
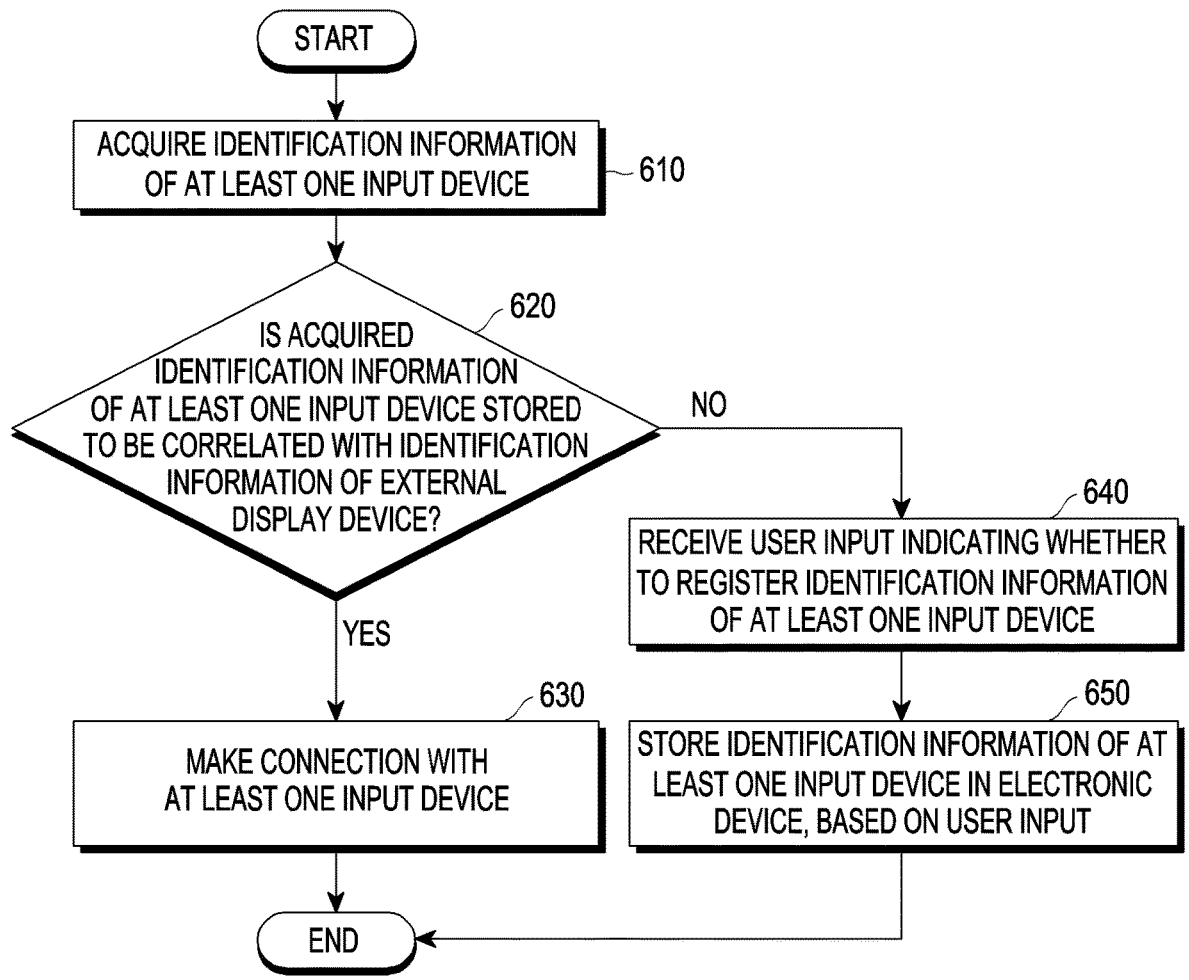
FIGS. 6 and 7 are flowcharts illustrating an example function or an example operation in which an electronic device makes a connection with at least one input device, based on a comparison result and releases a right to allow the connection according to various embodiments.
Figure 7:
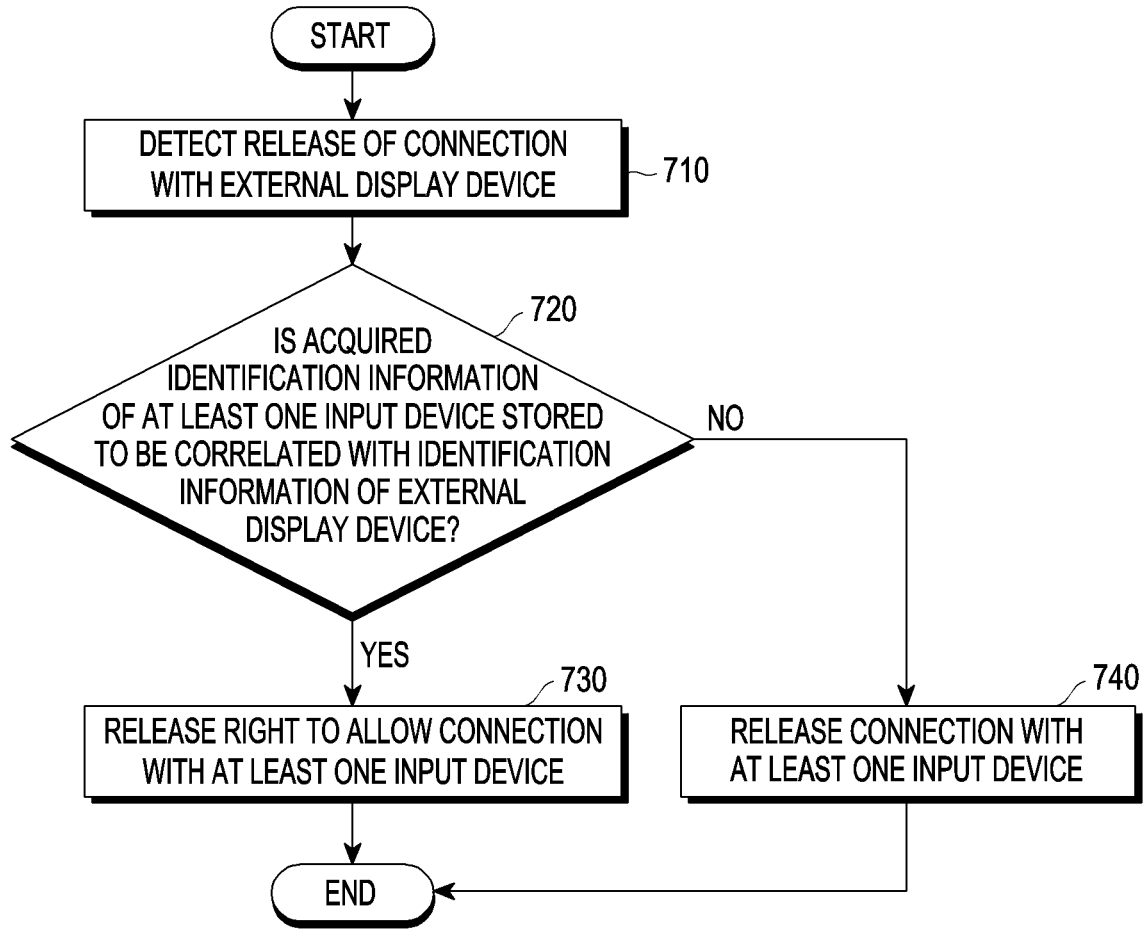

FIGS. 6 and 7 are flowcharts illustrating an example function or an example operation in which the electronic device 201 makes a connection with at least one input device, based on a comparison result and releasing a right to allow the connection according to various embodiments. Operation 340 and operation 350 according to an embodiment of the disclosure are described in greater detail with reference to FIG. 6 and FIG. 7.

Referring to FIG. 6, the electronic device 201 according to an embodiment of the disclosure may acquire identification information of at least one input device (for example, the first input device 501a, the second input device 501b, the third input device 501c, and/or the fourth input device 501d) in operation 610. The identification information of at least one input device (for example, the first input device 501a, the second input device 501b, the third input device 501c, and/or the fourth input device 501d) according to an embodiment of the disclosure may include, for example, a name, a Bluetooth MAC address, and/or a manufacturer name of at least one input device (for example, the first input device 501a, the second input device 501b, the third input device 501c, and/or the fourth input device 501d).

The electronic device 201 according to an embodiment of the disclosure may determine whether the acquired identification information of at least some input devices among the at least one input device (for example, the first input device 501a, the second input device 501b, the third input device 501c, and/or the fourth input device 501d) is stored to be correlated with the identification information of the external display device 401 in operation 620. The electronic device 201 according to an embodiment of the disclosure may identify whether the identification information of the external electronic device 401 and the identification information of at least one input device (for example, the first input device 501a, the second input device 501b, the third input device 501c, and/or the fourth input device 501d) are stored in the memory of the electronic device 201 as illustrated in [Table 2].

When there is an input device that matches reference information stored in the electronic device 201 among the acquired identification information of at least one input device (for example, the first input device 501a, the second input device 501b, the third input device 501c, and/or the fourth input device 501d), the electronic device 201 according to an embodiment of the disclosure may make the connection with at least one input device (for example, the first input device 501a and the second input device 501b) which the identification information matches in operation 630. Although FIG. 6 describes that it is assumed that the identification information of at least one input device matches the reference information stored in the electronic device 201, an operation of determining whether the identification information of at least one input device matches the reference information stored in the electronic device 201 may be further included between operation 620 and operation 630 according to an embodiment of the disclosure.

When acquired the identification information of at least one input device (for example, the first input device 501a, the second input device 501b, the third input device 501c, and/or the fourth input device 501d) is not stored to be correlated with the identification information of the external display device 401, the electronic device 201 according to an embodiment of the disclosure may receive an input (e.g., a user input) indicating whether to register the identification information of at least one input device in operation 640. For example, the electronic device 201 according to an embodiment of the disclosure may receive a user input indicating whether to register the identification information of at least one input device (for example, the first input device 501a, the second input device 501b, the third input device 501c, and/or the fourth input device 501d) by displaying a popup window for registering the identification information of the input device in the electronic device 201. Further, operation 640 according to an embodiment of the disclosure may include an operation of selecting at least one input device to be connected with at least one detected input device (for example, the first input device 501a, the second input device 501b, the third input device 501c, and/or the fourth input device 501d) in operation 640. The operation may be performed through, for example, a popup message.

The electronic device 201 according to an embodiment of the disclosure may store the identification information of at least one input device (for example, the first input device 501a and the second input device 501b) in the electronic device 201, based on a user input in operation 650. Operation 650 according to an embodiment of the disclosure may be understood as an operation of storing the external display device 401 and at least one input device (for example, the first input device 501a and the second input device 501b) to be correlated with each other in the electronic device 201. For example, the electronic device 201 may update reference information (for example, [Table 2]) stored in memory (for example, the memory 230 of FIG. 2), based on information on the external display device 401 and at least one input device (for example, the first input device 501a and the second input device 501b). According to an embodiment of the disclosure, when selection of not storing the identification information of at least one input device (for example, the first input device 501a and the second input device 501b) is not stored in the electronic device 201 is received from the user, the identification information of at least one input device (for example, the first input device 501a and the second input device 501b) may not be stored in the electronic device 201 and may be temporarily connected.

Referring to FIG. 7, the electronic device 201 according to an embodiment of the disclosure may detect release of the connection with the external display device 401 in operation 710. Operation 710 according to an embodiment of the disclosure may be understood as an operation of releasing the dex mode.

The electronic device 201 according to an embodiment of the disclosure may determine whether the acquired identification information of at least one input device (for example, the first input device 501a and the second input device 501b) is stored to be correlated with the identification information of the external display device 401 in operation 720. The electronic device 201 according to an embodiment of the disclosure may identify whether the identification information of the external display device 401 and the identification information of at least one input device (for example, the first input device 501a and the second input device 501b) are stored in the memory of the electronic device 201 as shown in [Table 2].

The electronic device 201 according to an embodiment of the disclosure may release the right to allow the connection with at least one input device (for example, the first input device 501a and the second input device 501b) in operation 730 when operation 720 is "yes". A function or an operation of "releasing a connection allowance authority" according to an embodiment of the disclosure may be interchangeably/alternatively used with the term "inactivation of the right to allow the connection", "configuration of the right to allow the connection as disable" or "inactivation of at least one input device". When release of the external display device 401 is detected, the electronic device 201 according to an embodiment of the disclosure may configure a value of the right to allow the connection with at least one input device (for example, the first input device 501a and the second input device 501b) as disable and, accordingly, another electronic device may access at least one input device (for example, the first input device 501a and the second input device 501b). Accordingly, a user of the other electronic device may occupy and use at least one input device (for example, the first input device 501a and the second input device 501b). The electronic device 201 according to an embodiment of the disclosure may configure the right to allow the connection as disable by configuring, for example, a policy value for at least one input device (for example, the first input device 501a and the second input device 501b) as a forbidden value (for example, 0). On the other hand, the electronic device 201 according to an embodiment of the disclosure may configure the right to allow the connection as disable by configuring, for example, a policy value for at least one input device (for example, the first input device 501a and the second input device 501b) as enable during the connection with at least one input device (for example, the first input device 501a and the second input device 501b) and, accordingly, may prevent or inhibit the other electronic device from accessing at least one input device (for example, the first input device 501a and the second input device 501b). Accordingly, the user of the other electronic device may not occupy and use at least one input device (for example, the first input device 501a and the second input device 501b). The electronic device 201 according to an embodiment of the disclosure may configure the right to allow the connection as enable by configuring, for example, a policy value for at least one input device (for example, the first input device 501a and the second input device 501b) as an allowed value (for example, 100).

When the identification information of at least one input device (for example, the first input device 501a and the second input device 501b) is not stored, the electronic device 201 according to an embodiment of the disclosure may release the connection with at least one input device (for example, the first input device 501a and the second input device 501b) in operation 740. According to an embodiment of the disclosure, the release of the connection in operation 740 may be understood as the meaning of releasing a session configured between at least one input device (for example, the first input device 501a and the second input device 501b) and the electronic device 201, and may correspond to disconnection.

When the electronic device 201 according to an embodiment of the disclosure operates in the dex mode and a mouse is connected to the electronic device 201 as an input device, it is possible to control a screen (for example, the second screen) displayed on the external display device 401 to be changed by controlling a pointing object (for example, a cursor) displayed on the external display device 401. Further, when the electronic device 201 according to an embodiment of the disclosure operates in the dex mode and a keyboard is connected to the electronic device 201 as an input device, the electronic device 201 may perform control to display information (for example, text) input through the keyboard on a screen (for example, the second screen) displayed on the external display device 401. According to an embodiment, a launcher controlling the screen (for example, the first screen) displayed in the electronic device 201 may be different from a launcher controlling the screen (for example, the second screen) displayed in the external display device 401. In other words, the first screen and the second screen may be independently controlled. According to an embodiment of the disclosure, it is possible to obtain an effect in that a plurality of users can simultaneously use one electronic device 201. For example, when a first user executes the dex mode in the electronic device 201 to activate the connection with the external display device 401, the electronic device 201 may be linked to the external display device 401 and may activate the connection with the corresponding input device using information on a mouse and a keyboard stored in the electronic device 201 and use the activated input device in an application (for example, a dex launcher) executed by the external display device 401 which is an extended task area. The first user may independently perform his/her own task in the extended area and simultaneously a second user may play a game or view a video through the electronic device 201 of the first user. According to an embodiment of the disclosure, the electronic device 201 may deactivate the connection with the connected mouse and keyboard together with the end of the dex mode. Accordingly, when another third user desires to use the dex mode through the external display device 401 with which the first user made the connection, the third user can use the corresponding mouse and the keyboard.

Figure 8:
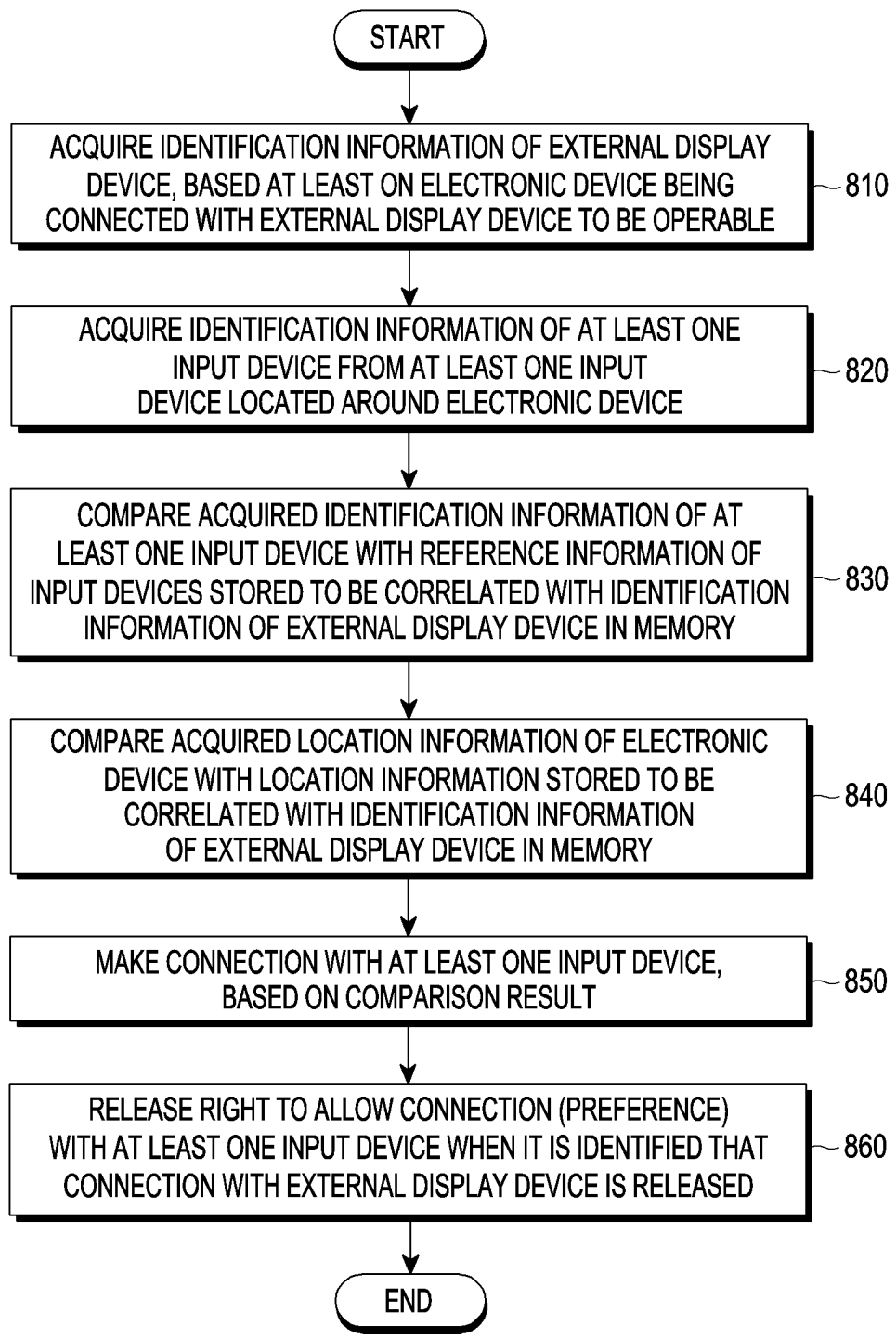
FIG. 8 is a flowchart illustrating an example function or an example operation in which an electronic device makes a connection with at least one input device further using location information according to various embodiments.

FIG. 8 is a flowchart illustrating an example function or an example operation in which an electronic device makes a connection with at least one input device further using location information according to various embodiments.

Referring to FIG. 8, the electronic device 201 according to an embodiment of the disclosure may acquire identification information of an external display device 401, based at least on that the electronic device 201 is connected to the external display device 401 to be operable in operation 810. Referring to FIG. 4A, after the electronic device 201 is connected to the external display device 401 (for example, connected through wired communication or wireless communication) to be operable, a user input for the user interface 110 of executing the dex mode may be received. Referring to FIG. 4B, when the user input for the user interface 110 of executing the dex mode is received, the electronic device 201 according to an embodiment of the disclosure may display a user interface for selecting the external display device 401 to display a screen. As described above, according to an embodiment of the disclosure, as the user input for the user interface 110 for executing the dex mode is received, the electronic device 201 according to an embodiment of the disclosure may determine a user's intent to display, on the external display device 401, a screen different from that on the electronic device 201. In this case, when the user input for the user interface 110 for executing the dex mode is received, the electronic device 201 according to an embodiment of the disclosure may acquire identification information of the external display device 401. Referring to FIG. 4C, the electronic device 201 according to an embodiment of the disclosure and the external display device 401 may be connected through wired communication. Alternatively, referring to FIG. 4D, the electronic device 201 according to an embodiment of the disclosure and the external display device 401 may be connected through wireless communication. When the electronic device 201 and the external display device 401 are connected through wired communication or wireless communication, the electronic device 201 according to an embodiment of the disclosure may execute the dex mode without receiving the user input for the user interface 110 for executing the dex mode. When the dex mode is executed, the electronic device 201 according to an embodiment may acquire identification information of the external display device 401 from the external display device 401. According to an embodiment of the disclosure, a user interface such as a popup window of asking the user about whether to receive identification information of the external display device 401 may be provided, and identification information of the external display device 401 may be acquired according to selection input by the user. According to an embodiment of the disclosure, the electronic device 201 according to an embodiment of the disclosure may make the connection with the external display device 401 by coming into contact with a specific part of the external display device 401 to be connected, through the electronic device 201. Referring to FIG. 5, the electronic device 201 according to an embodiment of the disclosure may acquire identification information of the external display device 401 from the external display device 401. The identification information of the external display device 401 according to an embodiment of the disclosure may include, for example, information on a manufacturer name of the external display device 401, a product name, a product serial number, a product type, an extended display identification data (EDID) version, a fluorescent or filter type, timing, a screen size, luminance, and/or pixels as shown in [Table 1] below.

The electronic device 201 according to an embodiment of the disclosure may acquire location and identification information of the electronic device 201 and identification information of at least one input device from at least one input device (for example, the first input device 501a, the second input device 501b, the third input device 501c. and/or the fourth input device 501d) in operation 820. The identification information of at least one input device (for example, the first input device 501a, the second input device 501b, the third input device 501c, and/or the fourth input device 501d) according to an embodiment of the disclosure may include, for example, a name, a Bluetooth MAC address, and/or a manufacturer name of at least one input device (for example, the first input device 501a, the second input device 501b, the third input device 501c, and/or the fourth input device 501d). The electronic device 201 according to an embodiment of the disclosure may identify the current location of the electronic device 201 through various positioning methods (for example, a geofencing method or an indoor positioning method).

The electronic device 201 according to an embodiment of the disclosure may compare the acquired identification information of at least one input device (for example, the first input device 501a, the second input device 501b, the third input device 501c, and/or the fourth input device 501d) with reference information of an input device stored to be correlated with the identification information of the external display device 401 in memory in operation 830. Memory (for example, the memory 230 of FIG. 2) according to an embodiment of the disclosure may store reference information as shown in [Table 2]. The electronic device 201 according to an embodiment of the disclosure may determine whether there is identification information that matches the external display device 401 and whether there is an input device having identification information that matches reference information among the identification information of at least one input device (for example, the first input device 501a, the second input device 501b, the third input device 501c, and/or the fourth input device 501d).

The electronic device 201 according to an embodiment of the disclosure may compare the acquired location information of the electronic device 201 with the location information stored to be correlated with the identification information of the external display device 401 in the memory in operation 840. According to an embodiment of the disclosure, the electronic device 201 may store location information and at least one input device (for example, the first input device 501a and the second input device 501b) that are correlated with each other as shown in [Table 3] below. However, according to an embodiment of the disclosure, although [Table 3] defines only the relation between the location information and at least one input device (for example, the first input device 501a and the second input device 501b), the relation with the external display device 401 may be further defined and stored in the electronic device 201. The electronic device 201 according to an embodiment of the disclosure may compare the acquired current location of the electronic device 201 with the stored location.

TABLE 3

| Location information | Input Method #1(keyboard) | Input Method #2(Mouse) |
| --- | --- | --- |
| Area #1 | D company keyboard (BD_ADDR - BC:85:56:10:AB:BI) | D company Mouse (BD_ADDR - 00:10:65:C0:00:01) |
| Area #2 | E Company keyboard (BD_ADDR - 01:23:45:AB:BI:4A) | E company Mouse (BD_ADDR - C8:60:00:BA:95:65) |
| Area #3 | | |

In operation 850, the electronic device 201 according to an embodiment of the disclosure may make a connection with at least one input device (for example, the first input device 501a, the second input device 501b, the third input device 501c, and/or the fourth input device 501d), based on a result of the comparison in operation 830 and operation 840. When it is determined that the connection with the external display device is released, the electronic device 201 according to an embodiment of the disclosure may release a connection allowance authority (e.g., preference) with at least one input device (for example, the first input device 501a, the second input device 501b, the third input device 501c, and/or the fourth input device 501d) in operation 860. When all of the identification information and the location information of the external display device 401 and at least one input device match reference information, the electronic device 201 according to an embodiment of the disclosure may make the connection with at least one input device. Operation 850 and operation 860 may refer to the description of FIG. 6 and FIG. 7.

According to an embodiment of the disclosure, the electronic device 201 may determine a distance (e.g., whether the electronic device is within a threshold proximity or distance) to at least one input device (for example, the first input device 501a and the second input device 501b) and, when the distance to at least one input device (for example, the first input device 501a and the second input device 501b) is longer than a predetermined threshold distance, may not make the connection. For example, the electronic device 201 may identify at least one input device (for example, the first input device 501a and the second input device 501b) located close to the external display device 401 and/or the electronic device 201 using short-range communication information, such as BLE or ultra-wideband (UWB) and, when at least one input device (for example, the first input device 501a and the second input device 501b) is located within a predetermined distance, make the connection. According to an embodiment of the disclosure, the external display device 401 may be specified based on various pieces of identification information such as NFC tagging, RFID input, QR code, PIN code, or payment information. For example, the electronic device 201 may identify information on at least one input device (for example, the first input device 501a and the second input device 501b) to make the connection, based on NFC tagging, RFID input, QR code, PIN code, or payment information. According to an embodiment of the disclosure, information on the external display device 401 may be transmitted from a server. For example, when the electronic device 201 and the external display device 401 are connected in the dex mode, the electronic device 201 may receive information on at least one input device (for example, the first input device 501a and the second input device 501b) from the server and make the connection with at least one input device (for example, the first input device 501a and the second input device 501b), based on the received information. According to an embodiment, the electronic device 201 may receive information on at least one input device (for example, the first input device 501a and the second input device 501b) based on a user account or a history from the server and make the connection. For example, the electronic device 201 may receive information on at least one input device (for example, the first input device 501a and the second input device 501b) registered in the same user account or receive information on at least one input device (for example, the first input device 501a and the second input device 501b) based on the history used for the connection with the external display device 401.

FIGS. 9A, 9B, 9C and 9D are diagrams illustrating an example user interface by which an electronic device enters a dex mode through wireless communication according to various embodiments.

Figure 9A:
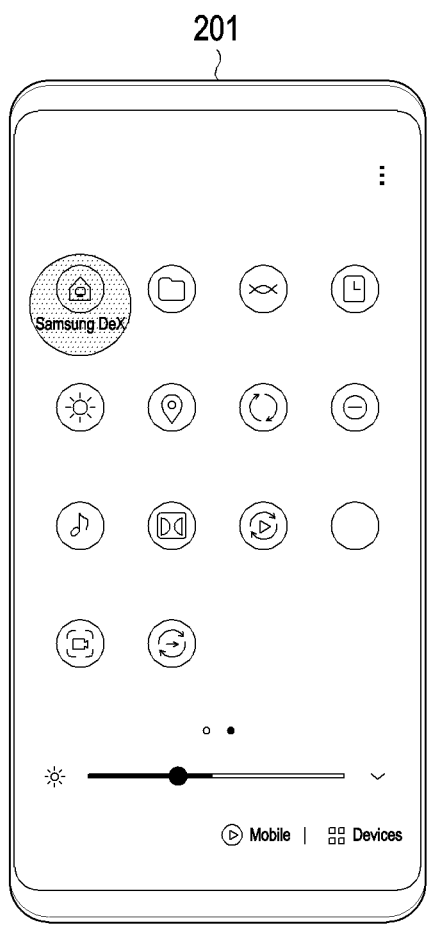
FIGS. 9A, 9B, 9C and 9D are diagrams illustrating examples of a user interface by which an electronic device enters a dex mode through wireless communication according to various embodiments.
Figure 9B:
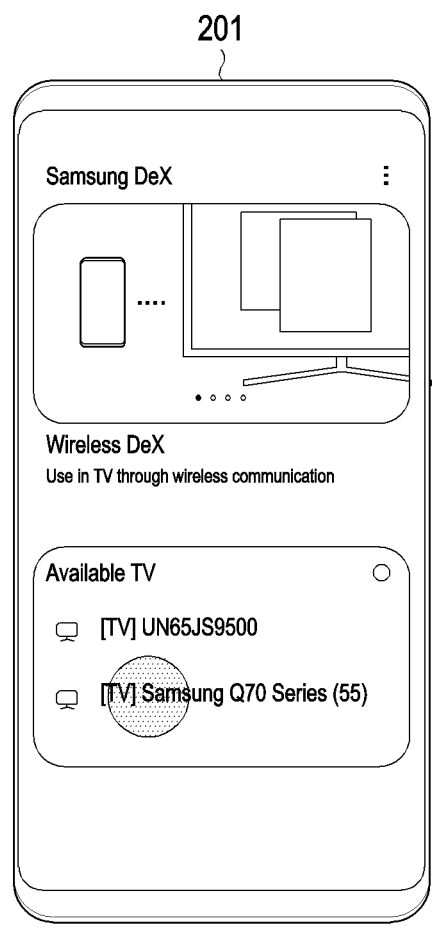
Figure 9C:
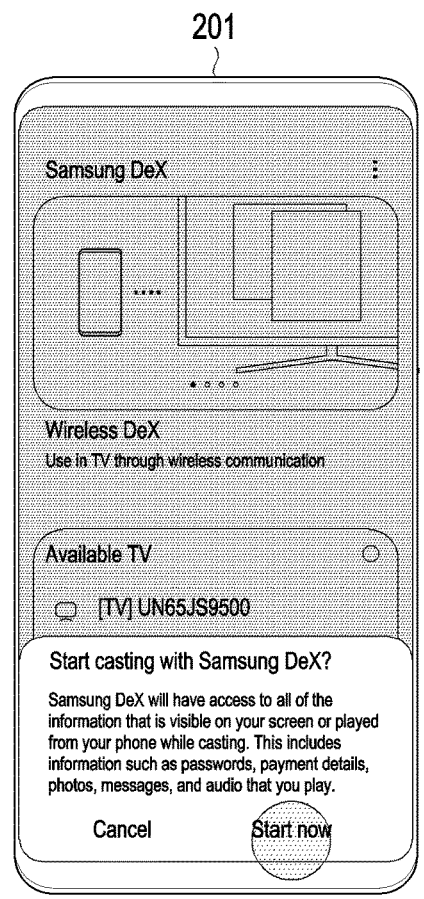
Figure 9D:
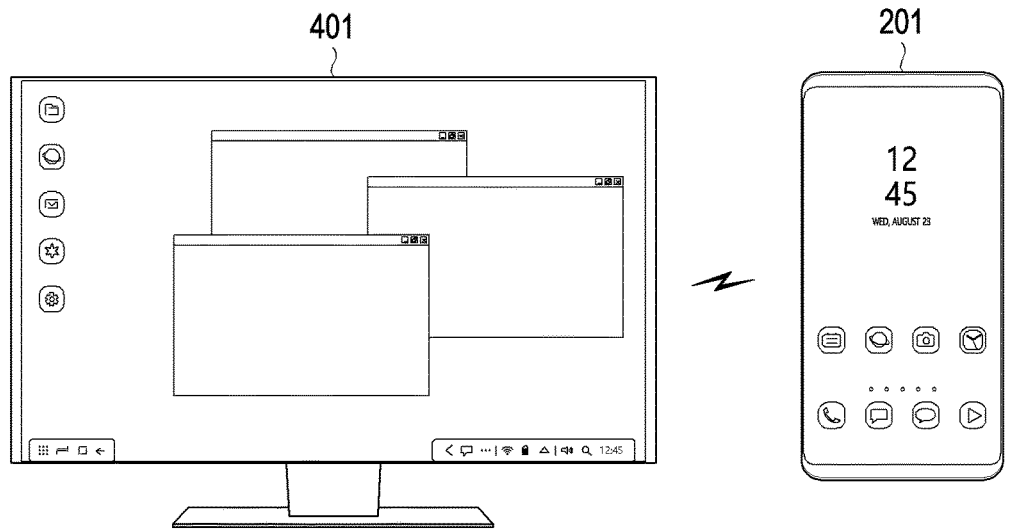

Referring to FIG. 9A, the electronic device 201 according to an embodiment of the disclosure may display an icon for entering the dex mode. The electronic device 201 according to an embodiment of the disclosure may receive a user's selection input for the icon for entering the dex mode. Referring to FIGS. 9B and 9C, the electronic device 201 according to an embodiment of the disclosure may display a list of external display devices to be connected and receive a selection input for one external display device. Referring to FIG. 9D, the electronic device 201 according to an embodiment of the disclosure may be connected with the selected external display device 401 through wireless communication and execute a plurality of applications.

Figure 10A:
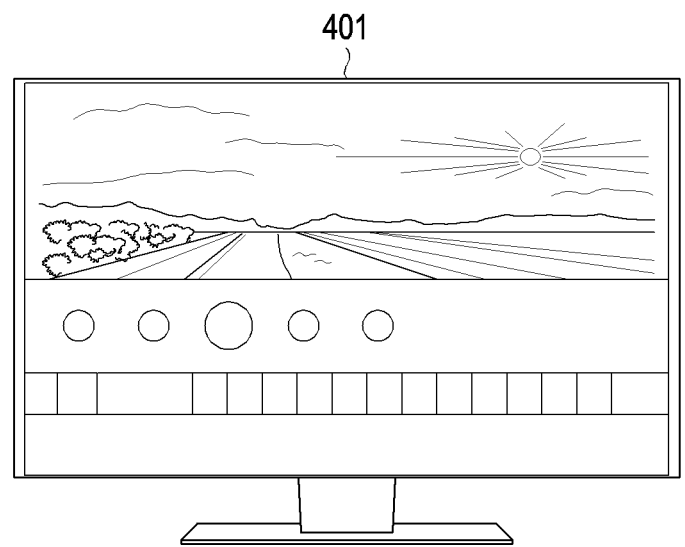
FIGS. 10A, 10B and 10C are diagrams illustrating examples in which an external display device enters a dex mode according to various embodiments.
Figure 10B:
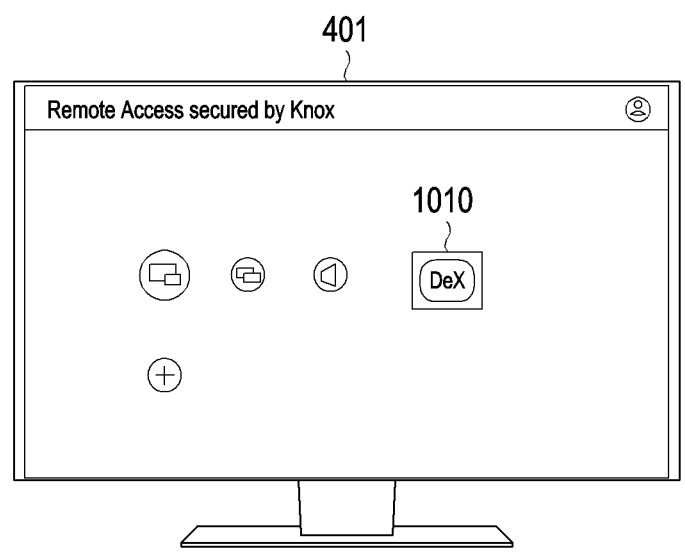
Figure 10C:
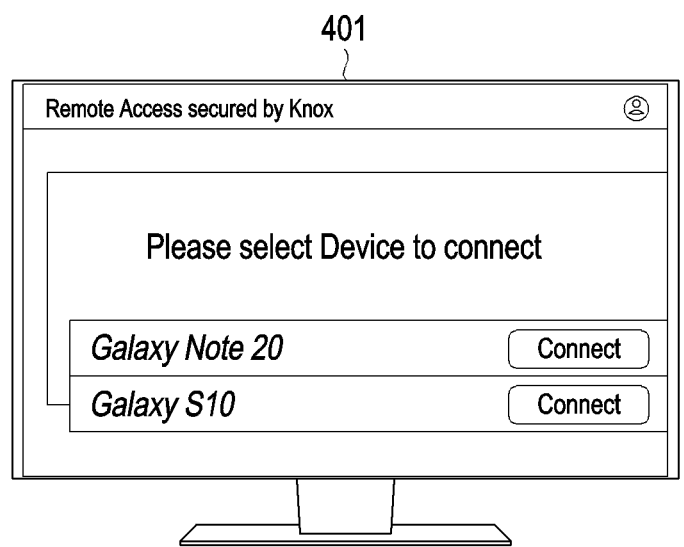

FIGS. 10A, 10B and 10C are diagrams illustrating examples in which an external display device enters a dex mode according to various embodiments.

Referring to FIG. 10A, the external display device 401 according to an embodiment of the disclosure may display a first screen for entering a remote control mode. Referring to FIG. 10B, the external display device 401 according to an embodiment of the disclosure may receive selection of a specific icon in a first screen and display a remote control screen. When the external display device 401 according to an embodiment of the disclosure receives selection of an icon 1010 for entering the dex mode, the external display device 401 may display a list of at least one portable terminal to be wirelessly connected as shown in FIG. 10C. According to an embodiment of the disclosure, when a user input for one list is selected among lists of at least one portable terminal to be wirelessly connected, the wireless connection with the selected portable terminal may be made.

Figure 11:
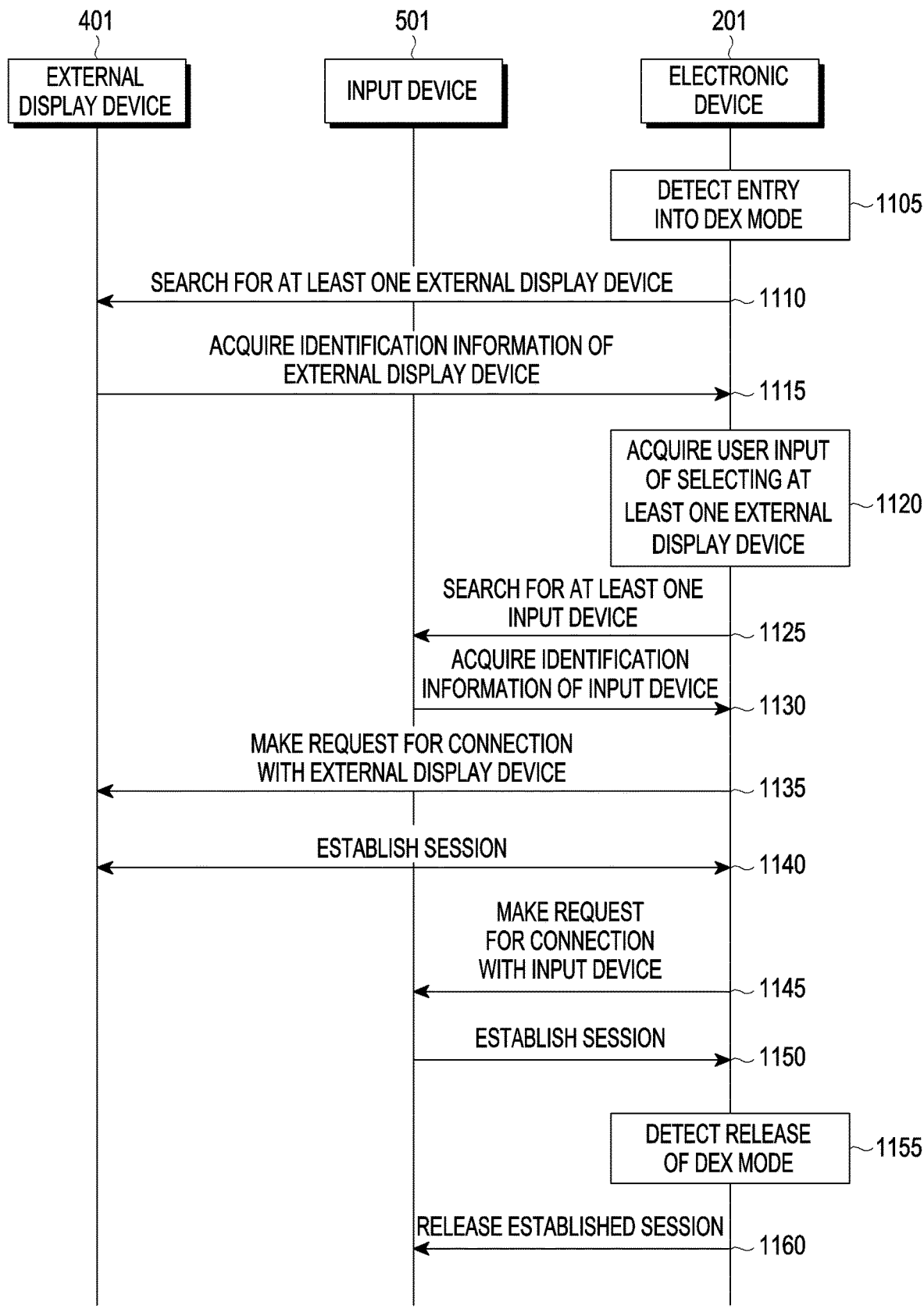
FIG. 11 is a signal flow diagram illustrating an example flow of signals between an external display device, an input device, and an electronic device according to various embodiments.

FIG. 11 is a signal flow diagram illustrating an example flow of signals between the external display device 401, the input device 501 (for example, the first input device 501a, the second input device 501b, the third input device 501c, and the fourth input device 501), and the electronic device 201 according to various embodiments.

Referring to FIG. 11, the electronic device 201 according to an embodiment of the disclosure may detect entry into the dex mode in operation 1105. When a user input for the user interface 110 for executing, for example, the dex mode is received, the electronic device 201 according to an embodiment may determine that entry into the dex mode is detected. However, according to various embodiments of the disclosure, operation 1105 may be omitted. When entry into the dex mode is detected, the electronic device 201 according to an embodiment of the disclosure may search for (for example, Wi-Fi direct scanning) at least one external display device 401 in operation 1110. The electronic device 201 according to an embodiment of the disclosure may acquire identification information of the external display device 401 (for example, Bluetooth MAC address and/or a name of the external display device 401) from at least one external display device 401 in operation 1115. The electronic device 201 according to an embodiment of the disclosure may acquire a user input for selecting at least one external display device 201 in operation 1120. Operation 1120 according to an embodiment of the disclosure may be understood as an operation of receiving a user input for selecting at least one external display device 401 to be connected with the electronic device 201. According to an embodiment of the disclosure, a dex unique ID may be generated according to operation 1120. The electronic device 201 according to an embodiment of the disclosure may search for (for example, Bluetooth scanning) at least one input device 501 (for example, the first input device 501a, the second input device 501b, the third input device 501c, and the fourth input device 501d) in operation 1125. The electronic device 201 according to an embodiment of the disclosure may acquire identification information from at least one input device 501 (for example, the first input device 501a, the second input device 501b, the third input device 501c, and the fourth input device 501d) in operation 1130. The electronic device 201 according to an embodiment of the disclosure may make a request for the connection with at least one external display device 401 selected according to operation 1130 in operation 1135 and establish a session with the external display device 401 in response thereto in operation 1140. The electronic device 201 according to an embodiment of the disclosure may make a request for the connection with the input device 501 (for example, the first input device 501a, the second input device 501b, the third input device 501c, and the fourth input device 501d) in operation 1145 and establish a session with the input device 501 (for example, the first input device 501a, the second input device 501b, the third input device 501c, and the fourth input device 501d) in response thereto in operation 1150. According to an embodiment of the disclosure, in operation 1155, the electronic device 201 may detect release of the dex mode. For example, when a user input for the user interface 110 for executing the dex mode is received again, in other words, when a user input for deactivating the activated user interface 110 is received, the electronic device 201 according to an embodiment of the disclosure may detect release of the dex mode. When detecting release of the dex mode, the electronic device 201 according to an embodiment of the disclosure may release the session established with the input device 501 (for example, the first input device 501a, the second input device 501b, the third input device 501c, and the fourth input device 501d) in operation 1160.

An electronic device (for example, the electronic device 201) according to an example embodiment of the disclosure may include: a communication circuit (for example, the communication module 290 of FIG. 2), memory (for example, the memory 230 of FIG. 2), a touch screen display (for example, the display module 260 of FIG. 2), and at least one processor, comprising processing circuitry (for example, the processor 220 of FIG. 2), operatively connected to the communication circuit, the memory, and the touch screen display, wherein the memory may be configured to store instructions that, when executed, cause at least one processor, individually and/or collectively, to:

acquire identification information of an external display device (for example, the external display device 401), based on the electronic device being connected with the external display device to be operable, a first screen being displayed in the touch screen display and a second screen different from the first screen being displayed in the external display device, acquire identification information of at least one input device (for example, the first input device 501a, the second input device 501b, the third input device 501c, and the fourth input device 501d) from the at least one input device located within a threshold proximity of the electronic device, compare the acquired identification information of the at least one input device with reference information of the input devices stored to be correlated with the identification information of the external display device in the memory, make a connection with the at least one input device, based on a result of comparison, and based on identifying that the connection with the external display device is released, release a connection allowance authority (e.g., preference) with the at least one input device.

According to an example embodiment of the disclosure, the instructions may further include an instruction which, when executed, cause at least one processor, individually and/or collectively to cause the electronic device to: control the display to display a user interface making a request for the connection with the external display device (for example, the external display device 401) through the touch screen display (for example, the display module 260 of FIG. 2) based on the electronic device (for example, the electronic device 201) being connected to the external display device (for example, the external display device 401) to be operable and to acquire the identification information of the external display device (for example, the external display device 401), based on an input for the user interface being received.

According to an example embodiment of the disclosure, the identification information of the at least one input device (for example, the first input device 501a, the second input device 501b, the third input device 501c, and the fourth input device 501d) may include Bluetooth MAC address information.

According to an example embodiment of the disclosure, the instructions may further include an instruction which, when executed causes at least one processor, individually and/or collectively (for example, the processor 220 of FIG.

2), to perform control to determine whether the reference information is stored in the memory (for example, the memory 230 of FIG. 2) based on the identification information of the input devices being acquired from the input devices (for example, the first input device 501a, the second input device 501b, the third input device 501c, and the fourth input device 501d).

According to an example embodiment of the disclosure, the instructions may further include an instruction which, when executed by at least one processor, individually and/or collectively (for example, the processor 220 of FIG. 2), cause the electronic device to: control the display to display a popup message indicating whether to store the identification information of the at least one input device (for example, the first input device 501a, the second input device 501b, the third input device 501c, and the fourth input device 501d) in the memory (for example, the memory 230 of FIG. 2) through the touch screen display, based on the reference information determined not to be stored in the memory (for example, the memory 230 of FIG. 2).

According to an example embodiment of the disclosure, the instructions may further include an instruction that, when executed, causes at least one processor (for example, the processor 220 of FIG. 2), individually and/or collectively to, based on identifying that the connection with the external display device (for example, the external display device 401) is released, perform control to release the right to allow the connection with the at least one input device (for example, the first input device 501a, the second input device 501b, the third input device 501c, and the fourth input device 501d) by configuring the right to allow the connection as disable.

According to an example embodiment of the disclosure, the instructions may further include an instruction that, when executed, causes at least one processor (for example, the processor 220 of FIG. 2), individually and/or collectively to, based on the connection with the at least one input device (for example, the first input device 501a, the second input device 501b, the third input device 501c, and the fourth input device 501d) being made, perform control to configure the right to allow the connection as enable.

According to an example embodiment of the disclosure, the instructions may further include an instruction that, when executed, causes at least one processor (for example, the processor 220 of FIG. 2), individually and/or collectively to perform control to make the connection with the at least one input device (for example, the first input device 501a, the second input device 501b, the third input device 501c, and the fourth input device 501d) by identifying a current location of the electronic device and comparing the identified current location with a reference location stored in the memory (for example, the memory 230 of FIG. 2).

According to an example embodiment of the disclosure, the instructions may further include an instruction that, when executed, causes at least one processor (for example, the processor 220 of FIG. 2), individually and/or collectively, to perform control to identify a distance to the at least one input device (for example, the first input device 501a, the second input device 501b, the third input device 501c, and the fourth input device 501d) and, based on the identified distance being greater than a specified distance, not make the connection.

According to an example embodiment of the disclosure, the first screen (for example, home screen) and the second screen (for example, specific application execution screen) are configured to be independently controlled.

A method of controlling an electronic device (for example, the electronic device 201) according to an example embodiment of the disclosure may include: acquiring identification information of an external display device (for example, the external display device 401), based on the electronic device being connected with the display device to be operable, a first screen being displayed in a touch screen display (for example, the display module 260) of the electronic device and a second screen different from the first screen being displayed in the external display device, acquiring identification information of at least one input device from the at least one input device (for example, the first input device 501a, the second input device 501b, the third input device 501c, and the fourth input device 501d) located within a threshold proximity of the electronic device, comparing the acquired identification information of the at least one input device with reference information of the input devices stored to be correlated with the identification information of the external display device in the memory (for example, the memory 230) of the electronic device, making a connection with the at least one input device, based on a result of comparison, and based on identifying that the connection with the external display device is released, releasing a connection allowance authority (e.g., preference) with the at least one input device.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 240) including one or more instructions that are stored in a storage medium (e.g., internal memory 236 or external memory 238) that is readable by a machine (e.g., the electronic device 201). For example, a processor (e.g., the processor 220) of the machine (e.g., the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   memory;
   a communication circuit;
   a touch screen display; and
   at least one processor, comprising processing circuitry, operatively connected to the memory, the communication circuit, and the touch screen display,
   wherein the memory stores instructions that, when executed by at least one processor, individually and/or collectively, cause the electronic device to:
   obtain identification information of an external display device, based on the electronic device being operatively connected with the external display device, a first screen being displayed in the touch screen display, and a second screen different from the first screen being displayed in the external display device;
   obtain identification information of at least one input device from the at least one input device located within a threshold proximity of the electronic device through the communication circuit;
   compare the obtained identification information of the at least one input device with reference information of input devices stored to be correlated with the identification information of the external display device in the memory;
   connect to the at least one input device, based on a result of comparison; and
   based on the connection with the external display device being released, disable a connection allowance authority with respect to the at least one input device.

2. The electronic device of claim 1, wherein the instructions, when executed, cause the electronic device to:
   display a user interface configured to make a request for the connection with the external display device through the touch screen display based on the electronic device being connected to the external display device to be operable; and
   obtain the identification information of the external display device, based on an input being received via the user interface.

3. The electronic device of claim 1, wherein the identification information of the at least one input device includes Bluetooth MAC address information.

4. The electronic device of claim 1, wherein the instructions, when executed, cause the electronic device to: determine whether the reference information is stored in the memory, based on the identification information of the input devices being obtained from the input devices.

5. The electronic device of claim 4, wherein the instructions, when executed, cause the electronic device to: display a popup message indicating whether to store the identification information of the at least one input device in the memory through the touch screen display, based on the reference information being determined not to be stored in the memory.

6. The electronic device of claim 1, wherein the instructions, when executed, cause the electronic device to, bases on the connection with the external display device being released, release the connection allowance authority with respect to the at least one input device by setting the connection allowance authority as disable.

7. The electronic device of claim 1, wherein the instructions, when executed, cause the electronic device to, based on the connection with the at least one input device being made, set the connection allowance authority as enable.

8. The electronic device of claim 1, wherein the instructions, when executed, cause the electronic device to: identify a current location of the electronic device, and connect to the at least one input device by comparing the identified current location with a reference location stored in the memory.

9. The electronic device of claim 1, wherein the instructions, when executed, cause the electronic device to: identify a distance to the at least one input device and, based on the identified distance being greater than a specified distance, not make the connection.

10. The electronic device of claim 1, wherein the first screen and the second screen are configured to be independently controlled, and an input received from the at least one input device is displayed through the second screen.

11. A method of controlling an electronic device, the method comprising;
  obtaining identification information of an external display device, based on the electronic device being operatively connected with the display device, a first screen being displayed in a touch screen display of the electronic device and a second screen different from the first screen being displayed in the external display device;
  obtaining identification information of at least one input device from the at least one input device located within a threshold proximity of the electronic device;
  comparing the obtained identification information of the at least one input device with reference information of input devices stored to be correlated with the identification information of the external display device in the memory of the electronic device;
  connecting to the at least one input device, based on a result of comparison; and
  based on the connection with the external display device being released, disabling a connection allowance authority with respect to the at least one input device.

12. The method of claim 11, further comprising:
  displaying a user interface configured to make a request for the connection with the external display device through the touch screen display based on the electronic device being connected to the external display device to be operable; and
  obtaining the identification information of the external display device, based on an input being received via the user interface.

13. The method of claim 11, wherein the identification information of the at least one input device includes Bluetooth MAC address information.

14. The method of claim 11, further comprising determining whether the reference information is stored in the memory, based on the identification information of the input devices being obtained from the external input devices.

15. The method of claim 14, further comprising displaying a popup message indicating whether to store the identification information of the at least one input device in the memory through the touch screen display, based on the reference information determined not to be stored in the memory.

16. The method of claim 11, further comprising, based on the connection with the external display device being released, releasing the connection allowance authority with respect to the at least one input device by setting the connection allowance authority as disable.

17. The method of claim 11, further comprising, based on the connection with the at least one input device being made, setting the connection allowance authority as enable.

18. The method of claim 11, further comprising, identifying a current location of the electronic device, and connecting to the at least one input device by comparing the identified current location with a reference location stored in the memory.

19. The method of claim 11, further comprising, identifying a distance to the at least one input device and, based on the identified distance being greater than a specified distance, not making the connection.

20. The method of claim 11, wherein the first screen and the second screen are configured to be independently controlled, and an input received from the at least one input device is displayed through the second screen.

* * * * *